Aug. 25, 1959     B. P. EDMONDS     2,900,922
CAR ADVANCING AND RETARDING APPARATUS
Filed April 4, 1955     9 Sheets-Sheet 1
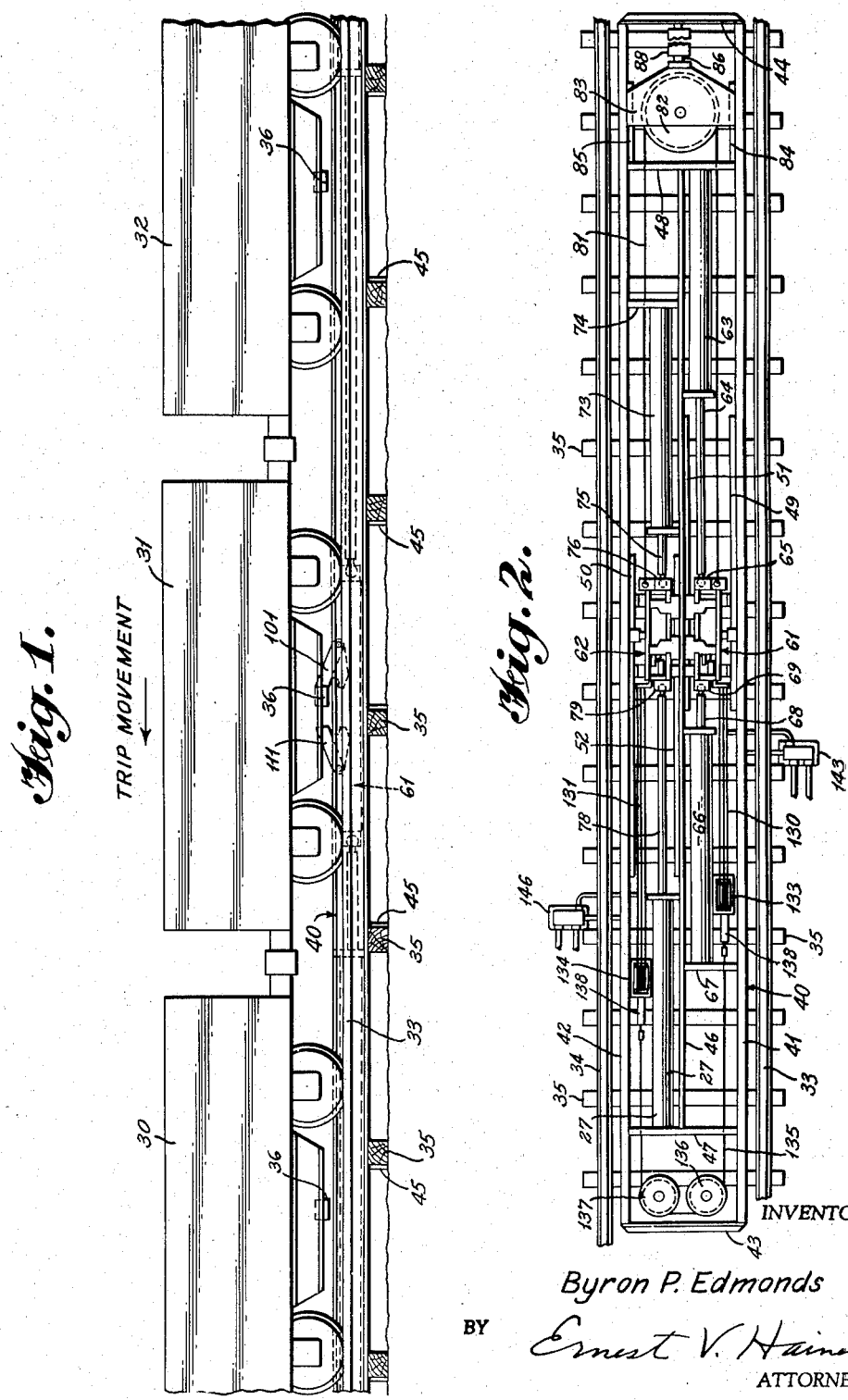
INVENTOR
Byron P. Edmonds
BY Ernest V. Haines
ATTORNEY Aug. 25, 1959     B. P. EDMONDS     2,900,922
CAR ADVANCING AND RETARDING APPARATUS
Filed April 4, 1955     9 Sheets-Sheet 2
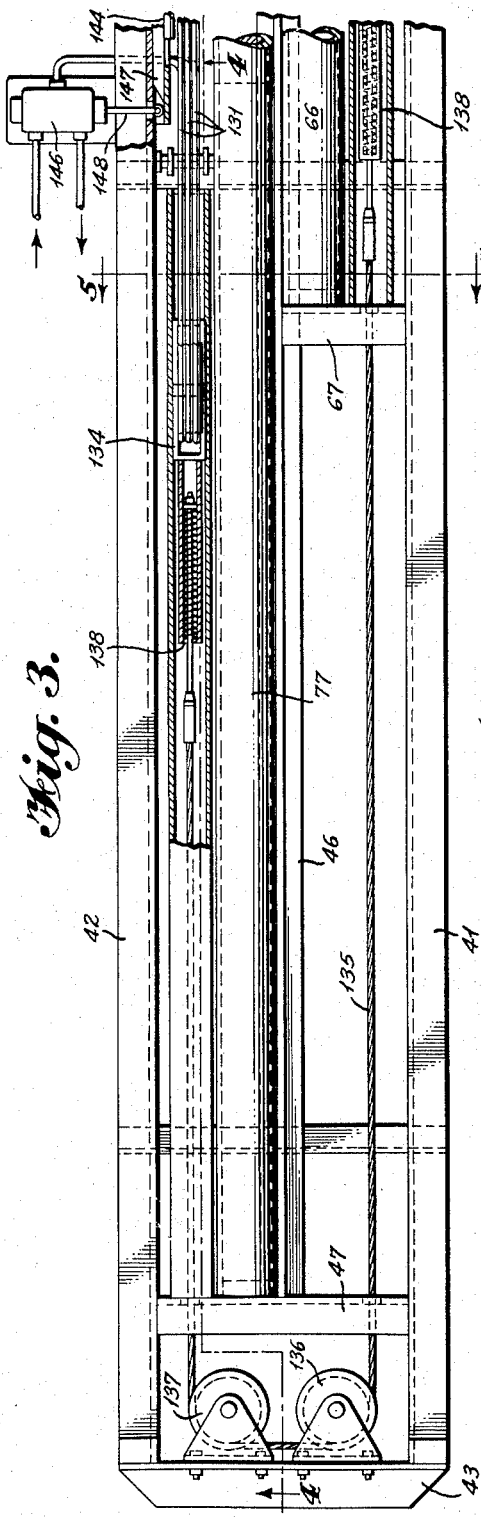
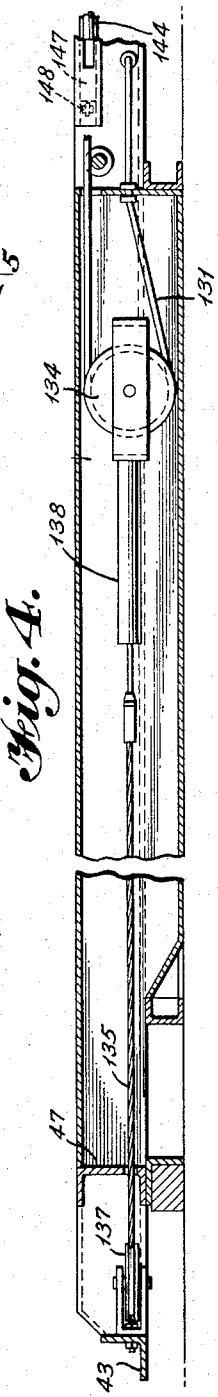
INVENTOR
*Byron P. Edmonds*
BY *Ernest V. Haines*
ATTORNEY

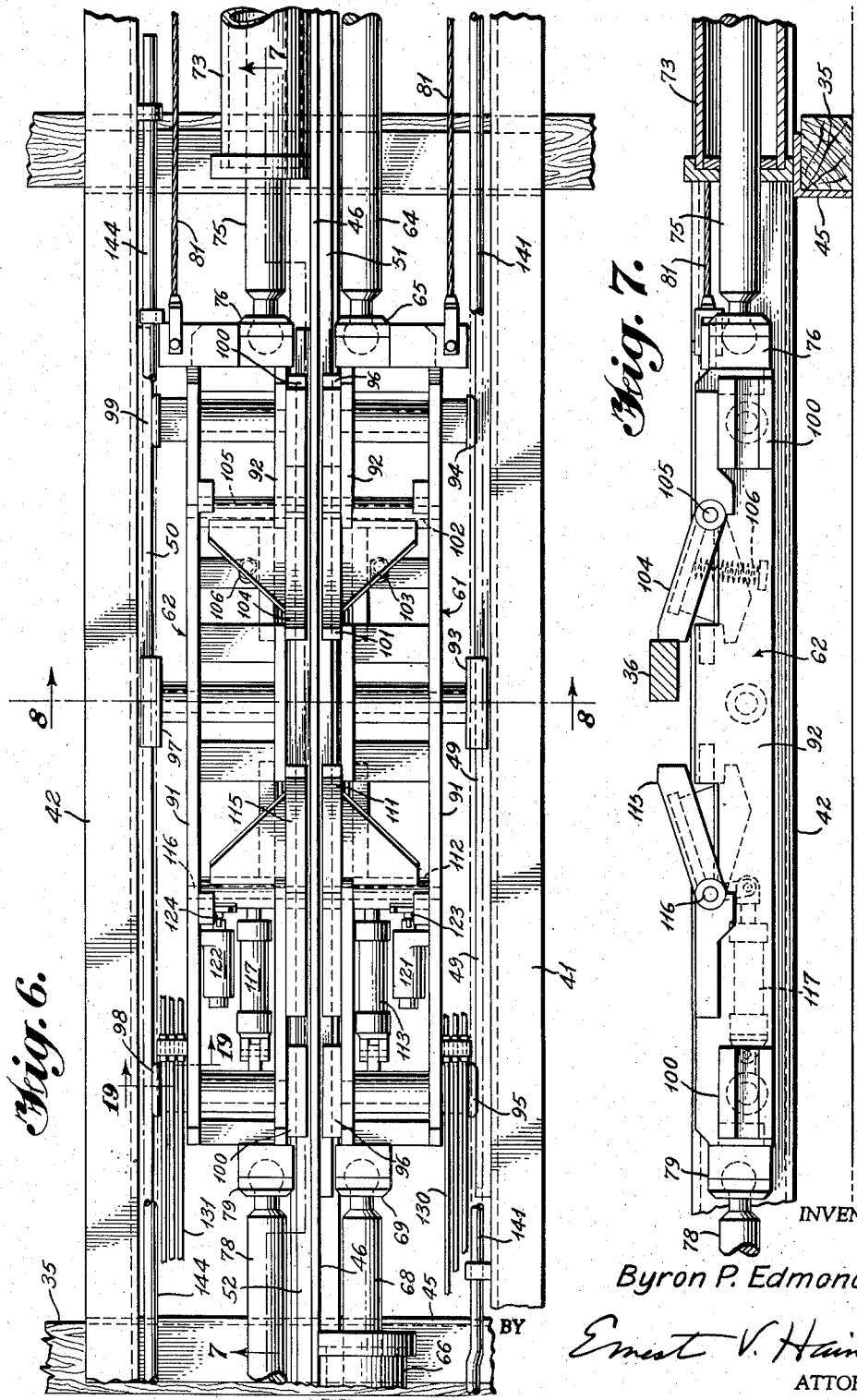

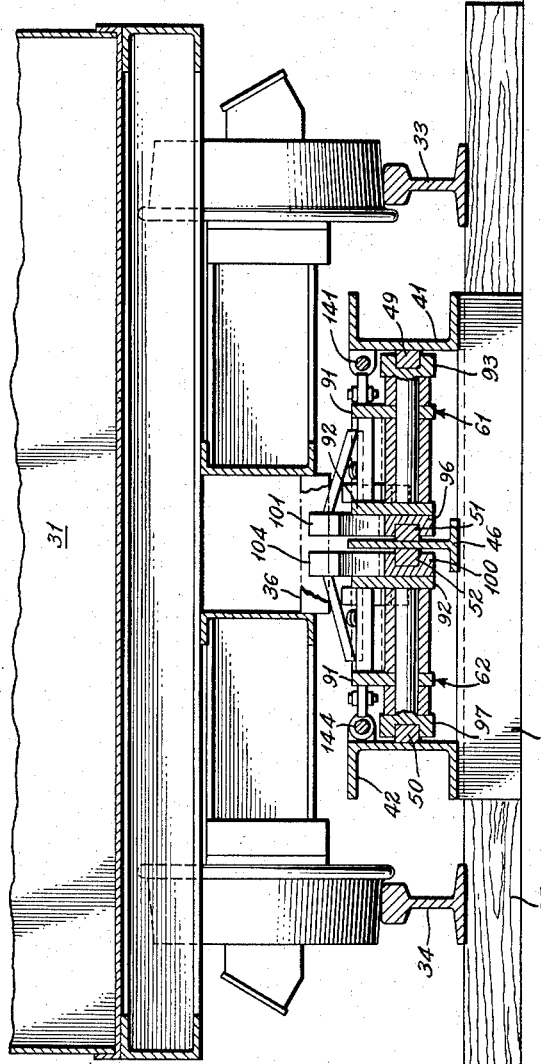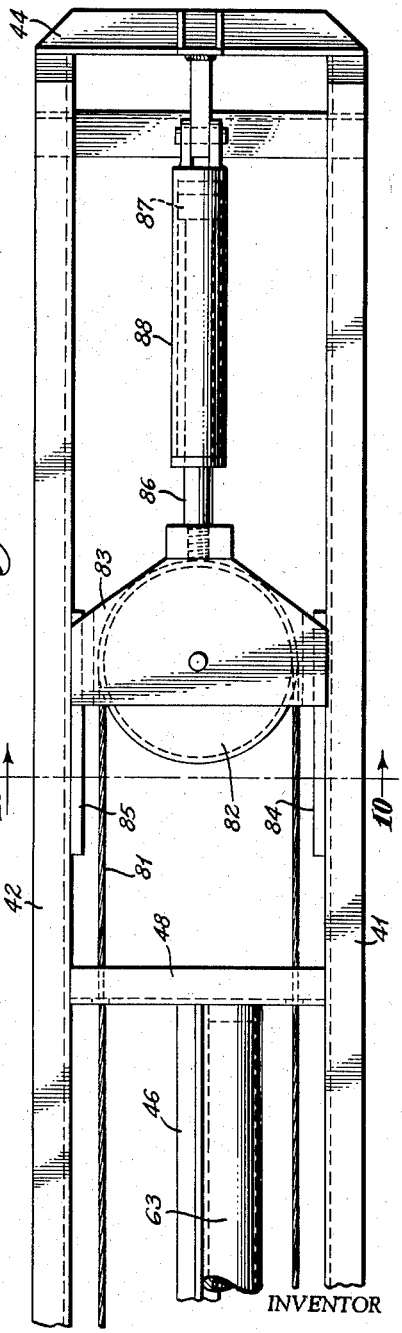

Aug. 25, 1959  B. P. EDMONDS  2,900,922
CAR ADVANCING AND RETARDING APPARATUS
Filed April 4, 1955  9 Sheets-Sheet 5
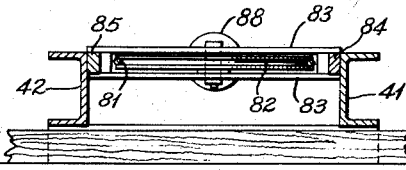
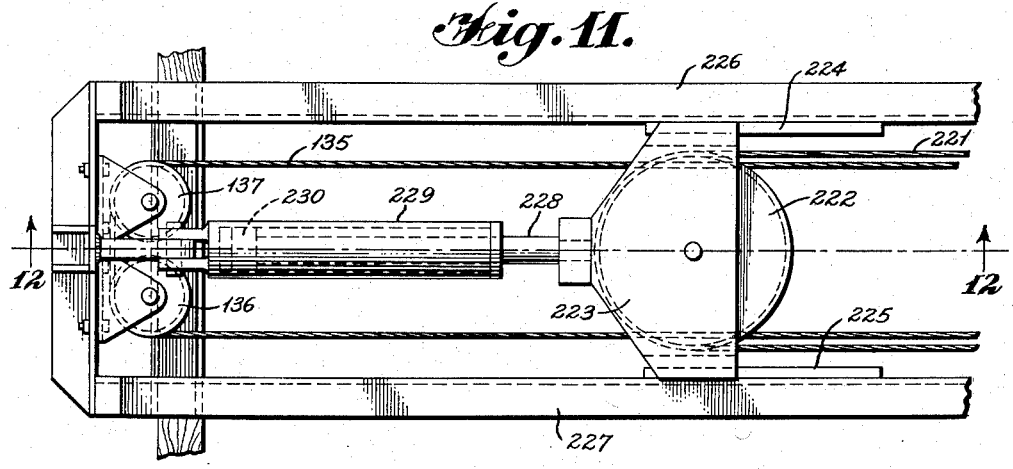
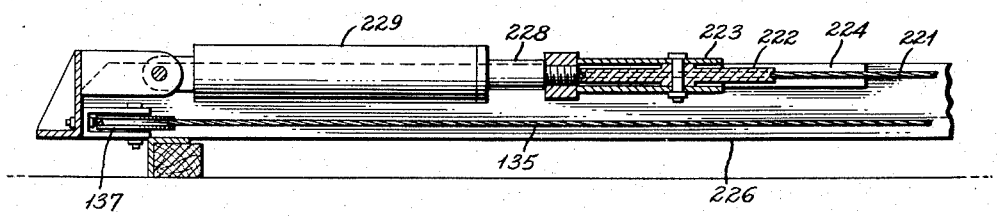
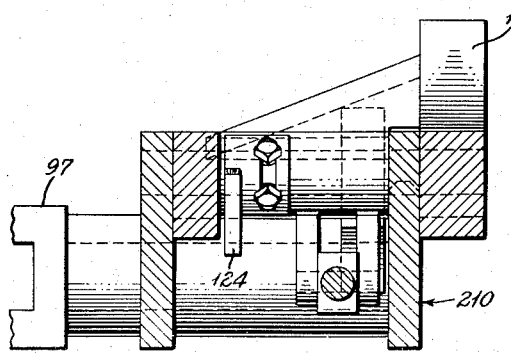
INVENTOR
Byron P. Edmonds
BY Ernest V. Haines
ATTORNEY Aug. 25, 1959
B. P. EDMONDS
2,900,922
CAR ADVANCING AND RETARDING APPARATUS
Filed April 4, 1955
9 Sheets-Sheet 6
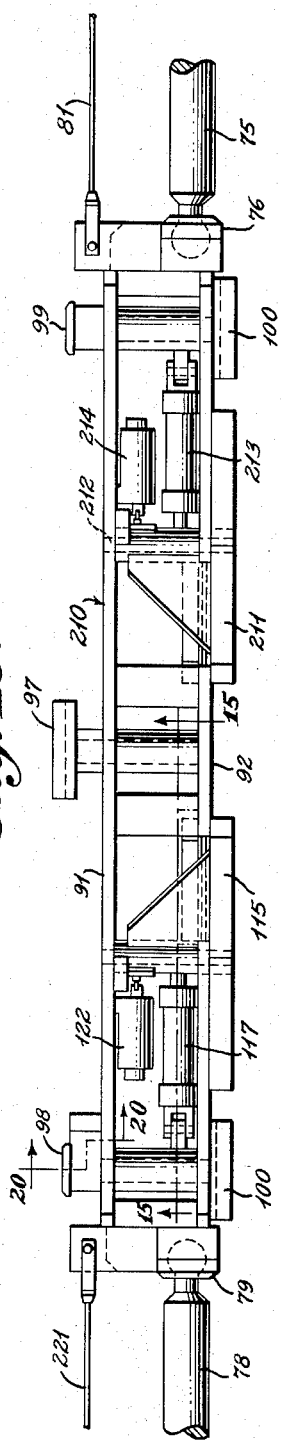
INVENTOR
Byron P. Edmonds
BY Ernest V. Haines
ATTORNEY

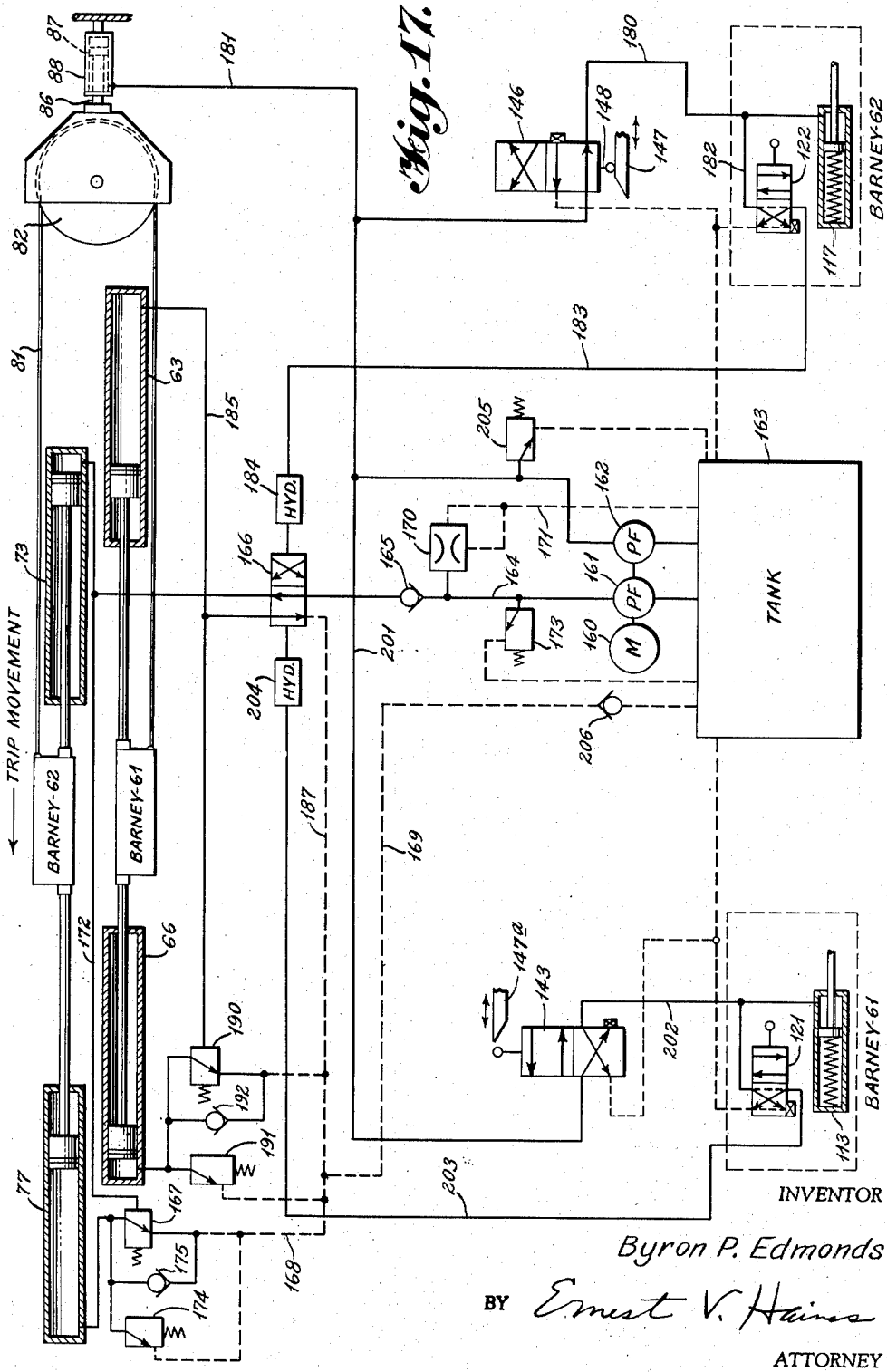

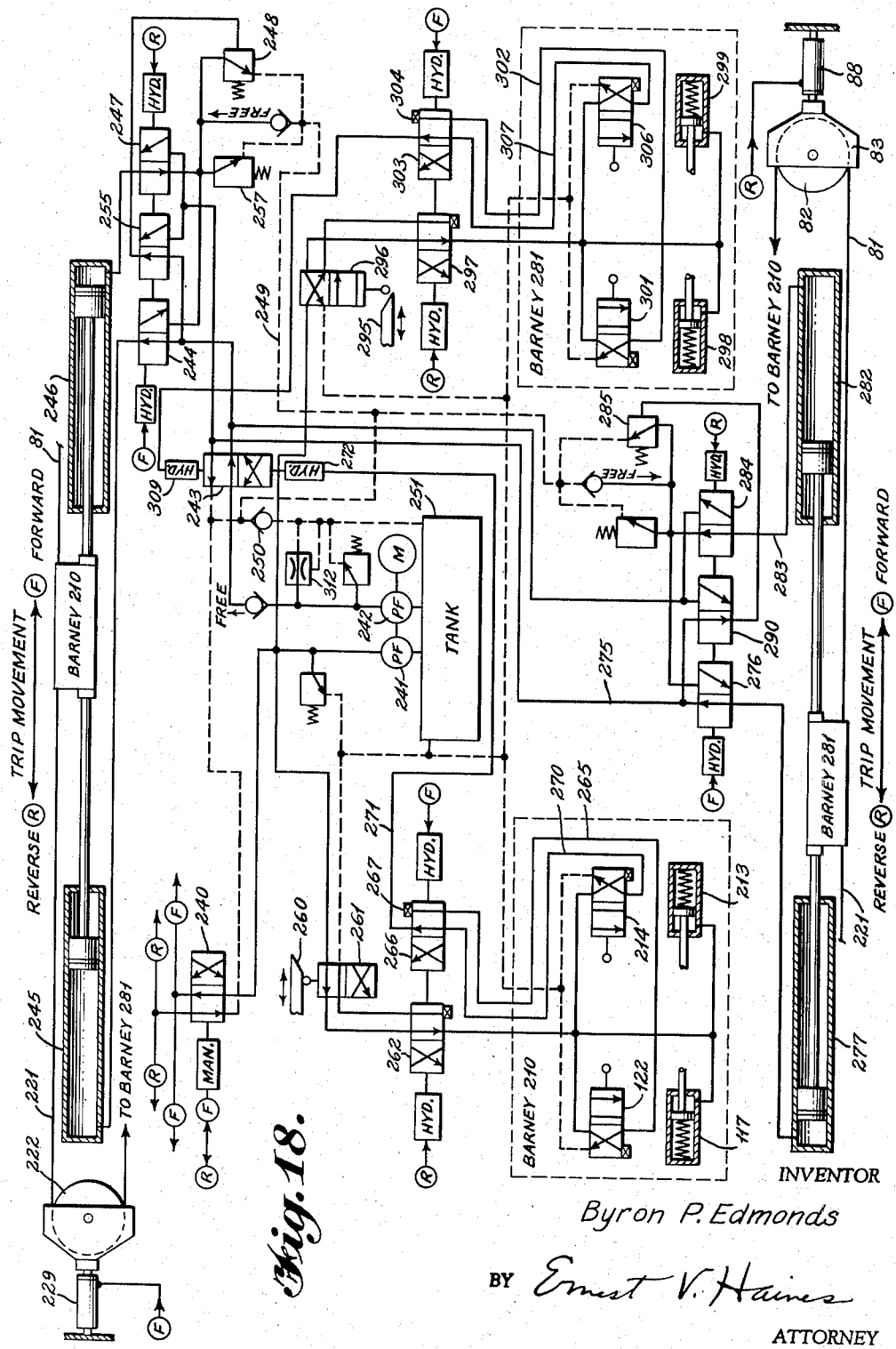

Aug. 25, 1959  B. P. EDMONDS  2,900,922
CAR ADVANCING AND RETARDING APPARATUS
Filed April 4, 1955  9 Sheets-Sheet 9

INVENTOR
Byron P. Edmonds

BY  Ernest V. Haines
ATTORNEY

# United States Patent Office 2,900,922
Patented Aug. 25, 1959

2,900,922

CAR ADVANCING AND RETARDING APPARATUS

Byron P. Edmonds, Alice, Tex.

Application April 4, 1955, Serial No. 498,850

8 Claims. (Cl. 104—162)

The present invention relates to mechanism for advancing and retarding vehicles along a path of movement. The invention finds particular utility in the advancing and retarding of railway cars such as mine cars along a track.

It is conventional in mining operations for a locomotive to move a string or "trip" of mine cars to the general location of the mining operation. The locomotive is then detached from the trip of cars and some means must be provided for advancing the trip so that each car in turn is presented to the loading position. Devices for thus moving the trip are not broadly new. One of the most popular devices for this purpose is illustrated in United States Patent 2,606,504, issued August 12, 1952, to William Raymond Stamler. That device includes a pair of barneys which are alternately advanced in parallel but longitudinally staggered paths along the track by hydraulic motors. Each barney is provided with a single car-engaging dog which engages a lug on a car during the advancing stroke of the barney. One of the barneys is advanced while the other is being retracted.

Devices of the type shown in the above mentioned patent and other hydraulically operated car-spotting devices known to applicant are capable of moving a trip of cars in one direction only. Such prior art devices are incapable of retarding movement of a trip of cars. For this reason it has been necessary to position such prior art devices in a sloping portion of the track and to move the trip of cars upgrade. These limitations on direction of movement and location of use of devices of this type are serious disadvantages.

The primary object of the present invention is to provide apparatus which is capable of either advancing or retarding movement of a trip of cars.

Another important object of the invention is to provide apparatus which can be used in any desired position along a track without regard to the slope or grade of the track.

Another important object of one form of the invention is to provide apparatus which is capable of moving a trip of cars in either direction along a track and of retarding movement of the trip in either direction.

A further object of the invention is to provide apparatus for the purpose described which is particularly advantageous in the mining operation known as "loop haulage" in which the car loading position is at a loop in the track and the track slopes downgrade from both ends of the loop.

A further object of the invention is to provide apparatus of the type described having a pair of barneys, each of which is provided with forwardly and rearwardly facing car-engaging dogs, in combination with means for retracting or inactivating the rearwardly facing dog at the end of the power stroke of its respective barney.

Another object of the invention is to provide a barney having forwardly and rearwardly facing car-engaging dogs and having means for preventing retraction of the barney until the rearwardly facing dog has been moved to car-disengaging position.

Another important object of the invention is to provide car advancing and retarding apparatus which includes a pair of barneys which are alternately advanced and retracted, each of the barneys being provided with forwardly and rearwardly facing car-engaging dogs, and in which the advancing barney is capable of partaking of limited continuing advancing movement after its companion barney has reached the limit of its retracting movement and prior to the time that such companion barney begins its advancing stroke. This feature of the invention permits disengagement of the car or trip of cars by the rearwardly facing dog of the advanced barney prior to the time that such barney begins its retracting movement and thus assures that one barney will not attempt to advance the car or trip while its companion barney is in condition to retard advancement of the car or trip.

Another object of the invention is to provide apparatus which is capable of automatically controlling the rate of movement of a trip of cars by automatically either advancing or retarding the trip as required by conditions and the grade of the track.

The foregoing and other objects and advantages of the invention can be more fully understood by reference to the following description of two exemplary forms of the invention, such description having reference to the accompanying drawings, wherein:

Figure 1 is a side elevational view of a trip of cars positioned over one form of the car pushing and retarding apparatus;

Figure 2 is a top plan view of the section of track and the car pushing and retarding apparatus shown in Figure 1;

Figure 3 is an enlarged top plan view of a portion of the apparatus shown in Figure 2, portions of the apparatus being shown broken away for clarity;

Figure 4 is a sectional view taken in the direction of the arrows along the line 4—4 of Figure 3;

Figure 5 is a sectional view taken in the direction of the arrows along the line 5—5 of Figure 3;

Figure 6 is an enlarged top plan view of another portion of the apparatus shown in Figure 2;

Figure 7 is a sectional view taken in the direction of the arrows along the line 7—7 of Figure 6;

Figure 8 is a sectional view taken in the direction of the arrows along the line 8—8 of Figure 6 and showing a portion of the track with a car positioned thereon;

Figure 9 is an enlarged top plan view of still another portion of the apparatus shown in Figure 2;

Figure 10 is a sectional view taken in the direction of the arrows along the line 10—10 of Figure 9;

Figure 11 is a top plan view comparable to Figure 3 but illustrating a second form of the apparatus;

Figure 12 is a sectional view taken in the direction of the arrows along the line 12—12 of Figure 11;

Figure 13 is a top plan view of one of the barneys used in the second form of the invention;

Figure 14 is a side elevational view of the barney illustrated in Figure 13;

Figure 15 is an enlarged sectional view taken generally in the direction of the arrows along the lines 15—15 of Figure 13;

Figure 16 is a sectional view taken in the direction of the arrows along the line 16—16 of Figure 15;

Figure 17 is a diagrammatic sketch of the hydraulic system utilized with the first illustrated form of the invention, conventional J.I.C. hydraulic symbols being used;

Figure 18 is a diagrammatic sketch of the hydraulic system used with the second illustrated form of the invention, conventional J.I.C. hydraulic symbols being used;

Figure 19:
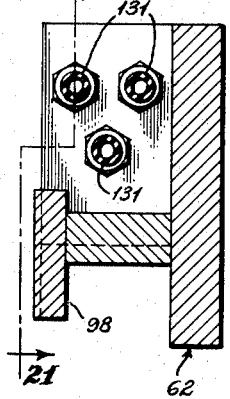
Figure 19 is an enlarged sectional view taken in the direction of the arrows along the line 19—19 of Figure 6.

The first illustrated form of the invention is capable of advancing a trip of cars in one direction and is also capable of retarding movement of the trip of cars in such direction. The second form of the invention is capable of moving a trip of cars in either direction and of retarding movement of the trip in either direction. In other words, the second form of the invention is capable of reversing the direction of movement of a trip of cars. The first or non-reversing form of the invention will be first described, followed by a description of those details of the second form of the invention which are essential to the reversing operation and which therefore differ from corresponding details of the first form of the invention.

Figure 1 illustrates a trip composed of cars 30, 31 and 32 positioned on rails 33 and 34 supported by cross-ties 35. Each of the cars of the trip is provided with a car lug 36 which is customarily fixed beneath the midportion of the car.

The apparatus for advancing and retarding the trip is shown in its entirety in Figure 2 and is designated generally by the reference numeral 40. A main frame for the apparatus is composed of side rails 41 and 42 and end rails 43 and 44. Attached beneath the side rails 41 and 42 are a plurality of cross-tie engaging members 45 positioned to engage the cross-ties 35 and to thus prevent longitudinal movement of the apparatus in either direction along the track. Any other suitable means may be used for preventing longitudinal movement of the apparatus along the track.

The frame of the apparatus also includes a longitudinally extending center rail 46 which extends between cross plates 47 and 48 attached to the side rails 41 and 42. The side rails 41 and 42 are provided on their inner surfaces with guide bars 49 and 50 respectively. Opposite the guide bar 49 and secured to the center rail 46 is a guide bar 51. Opposite the guide bar 50 and also secured to the center rail 46 is a guide bar 52. The guide bars 49, 50, 51 and 52 serve to guide the barneys hereinafter described.

The barneys are designated generally by the reference numerals 61 and 62. The barney 61 is provided with a hydraulic cylinder and piston assembly 63 having a piston rod 64 for advancing the barney 61 in the direction of trip movement, which is assumed to be from right to left as seen in Figures 1 and 2. The cylinder of the piston and cylinder assembly 63 is supported at its rearward end by the cross plate 48. The piston rod 64 is connected to the barney 61 by means of a ball and socket joint 65. A retarding cylinder and piston assembly 66 has one of its ends supported by a sub-cross plate 67. The retarding cylinder and piston assembly 66 is provided with a piston rod 68 which is connected to the barney 61 by means of a ball and socket joint 69. The barney 62 is similarly provided with a barney advancing cylinder and piston assembly 73 which has one of its ends fixed to a sub-cross plate 74 and which has a piston rod 75 connected to the barney 62 by means of a ball and socket joint 76. The barney 62 is also provided with a retarding cylinder and piston assembly 77 which has one of its ends connected to the cross plate 47 and which is provided with a piston rod 78 connected to the barney 62 by means of a ball and socket joint 79. It will be noted that the cylinder and piston assemblies attached to the respective barneys are longitudinally staggered and that the barneys will be moved through parallel but longitudinally staggered paths.

A cable 81 has its ends secured to the barneys 61 and 62 and extends over a sheave 82 journaled between plates 83 which are slidably guided by guide bars 84 and 85 attached to the side rails 41 and 42. The cable 81 and sheave 82 cause one of the barneys to be retracted while the other is advancing. The position of the sheave 82 longitudinally of the apparatus is controlled by means of a plunger 86 having a piston 87 thereon positioned within a cylinder 88. Fluid pressure urges the plunger 86 to the right as seen in Figures 1 and 9, in a manner later described. This arrangement constitutes an important feature of the invention in that it permits a barney to partake of limited continuing advancing movement after its companion barney has reached the limit of its retracting movement for the purpose hereinafter described.

The barneys 61 and 62 each have an outer side plate 91 and an inner side plate 92. Sliding shoes 93, 94 and 95 are journaled to the barney 61 and are arranged for sliding engagement on the guide bar 49. The barney 61 is also provided with inner guide shoes 96 positioned for sliding engagement with the guide bar 51 secured to the center rail 46. The barney 62 is similarly provided with outer sliding shoes 97, 98 and 99 for sliding engagement with the guide bar 50 and inner sliding shoes 100 which are slidable on the guide bar 52.

Barney 62 is provided with a trip advancing dog 104 which is pivotally mounted on a shaft 105 (see Figs. 6 and 7). The dog 104 is the dog which engages the car lug 36 to advance the trip in the direction of trip movement. The dog 104 is resiliently projected upwardly by means of a compression spring member 106. The spring member 106 normally projects the dog 104 into car lug-engaging position but enables that dog to retract and slide under the car lugs during retraction of the barney 62. The barney 61 is provided with a similar trip advancing dog 101 which is pivoted on shaft 102 and is resiliently projected into car-engaging position by means of a compression spring member 103.

The barney 62 is also provided with a trip retarding dog 115 which is pivotally mounted on shaft 116. The dog 115 is arranged to be pivotally moved from car-engaging to car-disengaging position by means of a hydraulic cylinder and piston assembly 117. The piston and cylinder assembly 117 is provided with a compression spring member which moves the dog 115 into projected or car-engaging position except when fluid pressure is supplied to the assembly 117 as hereinafter described for the purpose of retracting the dog 115 into car-disengaging position. The barney 61 is provided with a similar trip retarding dog 111 which is pivotally mounted on shaft 112 and which is projected and retracted by means of a cylinder, piston and spring assembly 113, similar to the assembly 117. Reference may be made to Figure 15 for details of the assemblies 113 and 117.

The barney 61 is provided with a four-way valve 121 and barney 62 is provided with a four-way valve 122 (see Figs. 6 and 15). The position of the four-way valve 121 is controlled by a finger 123 connected to and pivotally movable with the dog 111. The position of the four-way valve 122 is controlled by a finger 124 connected to and movable with the dog 115. The function of the valves 121 and 122 are more fully explained in connection with the description of the hydraulic system of the apparatus.

Figure 21:
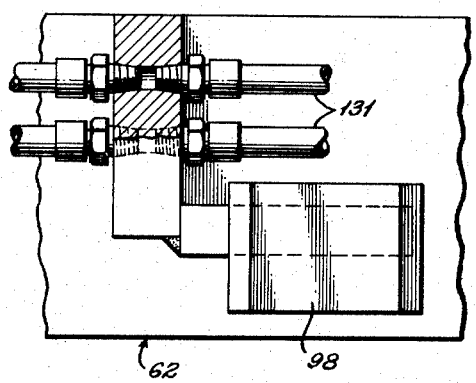
Figure 21 is a sectional view taken in the direction of the arrows along the line 21—21 of Figure 19.
Figure 20:
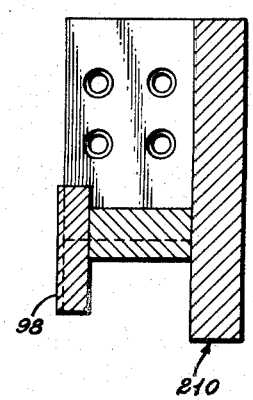
Figure 20 is an enlarged sectional view taken in the direction of the arrows along the line 20—20 of Figure 13.

Hydraulic fluid is supplied to the barney 61 through a plurality of flexible hoses 130 and hydraulic fluid is supplied to the barney 62 by means of a plurality of flexible hoses 131. The flexible hoses 130 are attached at one end to a stationary portion of the apparatus and at the opposite end to the barney 61. The flexible hoses 131 are similarly attached to the apparatus and to the barney 62 (see Figures 6, 19 and 21). Hoses 130 are maintained taut by a traveling sheave block 133 and the hoses 131 are kept taut by a traveling sheave block 134. The sheave blocks 133 and 134 are connected by a cable 135 which travels over stationary pulleys 136 and 137. At least one end of the cable 135 is provided with any suitable spring loaded means 138 for maintaining slight tension in the cable 135.

A valve control rod 141 is slidably supported by the side rail 41 and is adapted to be moved by the barney 61 to control the position of a four-way valve 143. A valve control rod 144 is similarly slidably movable along the side rail 42, is arranged to be moved by the barney 62, and is used to control the position of a four-way valve 146. The specific mechanism for controlling the positions of valves 143 and 146 is best illustrated in Figure 3 where the valve control rod 144 is shown as provided with a camming surface 147 which controls the position of the operating plunger 148 of the valve 146.

The operation of the form of the apparatus already described can best be explained by reference to the hydraulic diagram of Figure 17. The apparatus may be placed at any desired location along the track without regard to the grade of the track or the direction of slope.

The corresponding elements are designated by the reference numerals used above and the direction of trip movement is assumed to be from right to left as seen in Figure 17. The apparatus is capable of advancing a trip of cars in the direction of trip movement or of retarding movement of the cars in that direction.

A suitable motor 160 drives pumps 161 and 162 to pump fluid from a tank or reservoir 163. The pump 161 delivers fluid at high pressure which will be designated as operating pressure, and pump 162 delivers fluid at a lower pressure which will be designated pilot pressure.

The pump 161 is shown to be delivering hydraulic fluid through line 164, check valve 165 and valve 166 to cylinder 73 for the purpose of advancing barney 62 in the direction of trip movement. It will be understood that the dog 104 and the dog 115 carried by the barney 62 will be in their projected or car-engaging positions at this time, and a car lug 36 of, for example, the car 31 will be positioned between those dogs. It will also be understood that during advancing movement of the barney 62 the barney 61 will be undergoing retraction by the cable 81 and sheave 82 so that barney 61 will be moving to a position to engage a car lug 36 on, for example, the subsequent car 32, as hereinafter described. At this stage of the operation, fluid is being discharged from cylinder 77 through balancing valve 167 and is being returned through the dotted return lines 168 and 169 to the tank 163. The rate at which barney 62 moves the trip of cars can be controlled by the manually operated flow control valve 170 which can bypass any desired portion of the fluid from pump 161 through the dotted return line 171 to the tank 163. If the trip of cars attempts to move too rapidly in the direction of trip movement, as would be the case if the trip of cars attempted to run downgrade, the dog 115 on barney 62 engages a car lug 36. It will be seen that under such conditions the barney 62 will attempt to move to the left with the trip. Such leftward movement of the barney 62 and the trip of cars is retarded by the apparatus is a manner that can now be described.

Balancing valve 167 is held open by fluid pressure in line 172 which connects with cylinder 73. As soon as barney 62 partakes of excessive rate of leftward movement the pressure in cylinder 73 and line 172 drops, and balancing valve 167 either throttles or completely stops flow of fluid from cylinder 77 to the tank 163. The stopping or throttling of flow of fluid from cylinder 77 effectively retards excessive rate of movement of the barney 62 and the trip of cars in the leftward direction, as seen in Figure 17.

The valve 173 is a pressure relief valve to prevent development of excessive pressure in the outlet of the pump 161. The valve 174 is a pressure relief valve to prevent the development of excessive pressure in the cylinder 77, which might occur in case the trip were bumped during coupling to a locomotive or to additional cars. The valve 175 is a check valve which permits flow of fluid from the tank 163 through the return lines 169 and 168 to the cylinder 77 while barney 62 is being retracted and valve 167 is closed.

The camming surface 147, which has its motion controlled by the barney 62, controls the position of a four-way valve 146 as described above. When barney 62 reaches the limit of its working stroke (as distinguished from its maximum stroke hereinafter described), the leftward movement of the camming surface 147 engages the operating plunger 148 of the four-way valve 146 and moves that valve to the position shown in Figure 17. At this time fluid under pilot pressure from the pump 162 flows through valve 146 and through line 180 to cylinder and piston assembly 117 which controls the position of car retarding dog 115 on barney 62. The cylinder and piston assembly 117 at this time attempts to retract the dog 115 and that dog will be immediately retracted if the dog is not in engagement with a car lug 36. However, if barney 62 has been retarding movement of the trip of cars, the rearwardly facing dog 115 will be in engagement with a car lug and that dog cannot immediately be retracted to car-disengaging position. Under the latter circumstances dog 111 on barney 61 engages car lug 36 on subsequent car 32 to momentarily check movement of the trip of cars and fluid under operating pressure continues to be supplied by the pump 161 to the cylinder 73 so barney 62 continues to move to the left until the rearwardly facing dog 115 is out of engagement with the car lug. The dog 115 is then retracted by the cylinder and piston assembly 117. This continued leftward movement of barney 62 is permitted by limited leftward movement of the sheave 82 against the pilot pressure of the fluid supplied to the cylinder 88 by the pump 162 through the line 181. The movement of the dog 115 to retracted or car-disengaging position causes the finger 124 carried by that dog to engage the operating plunger of valve 122 to move that valve to the position opposite to that shown in the drawing. At this time, fluid under pilot pressure can flow through the lines 180 and 182, valve 122 and line 183 to the operating cylinder 184 of the four-way valve 166. Valve 166 is thereby shifted to a position opposite to that shown in the drawing, and this shifting of valve 166 causes barney 61 to be advanced and barney 62 to be retracted. Barney 61, being in engagement with car lug 36 on car 32, is thus capable of advancing the trip of cars.

Pump 161 then supplies fluid under operating pressure through valve 166 and line 185 to cylinder and piston assembly 63. The barney 61 then begins to move to the left with the result that the cable 81 begins to retract barney 62, eventually moving that barney to a position to engage a car lug 36 on a subsequent car in the trip. During retraction of barney 62, fluid from cylinder 73 passes through valve 166, line 187, line 168 and valve 175 to cylinder 77. During delivery of fluid at operating pressure to cylinder 63, dog 101 on barney 61 engages a car and moves the trip of cars to the left. At this time, fluid is discharging from cylinder 66 through balancing valve 190 and the return line 169 to the tank 163. In the event the trip of cars attempts to overrun barney 61, the pressure in cylinder 63 will drop. Cylinder 63 is in communication with balancing valve 190 through line 185 and a drop in pressure in cylinder 63 will cause valve 190 to throttle or completely stop the discharge of fluid from cylinder 66. Excessive rate of movement of the trip to the left is thus prevented.

The purpose of pressure relief valve 191 is to prevent development of excessive pressure in cylinder 66 in the event the trip of cars should be bumped during coupling. Check valve 192 permits cylinder 66 to be filled from the return line 169 during retracting of barney 61 and in this respect valve 192 serves a function similar to that of valve 175 described above.

As described above, barney 61 controls the movement of a camming surface 147a which engages and depresses the operating plunger of valve 143 when barney 61 reaches the limit of its power stroke. The valve 143 is thus moved to the position opposite to that shown in Figure 17. Fluid under pilot pressure can then flow from pump 162 through line 201, valve 143 and line 202 to the cylinder and piston assembly 113 which controls the position of dog 111 on barney 61. The cylinder and piston assembly 113 then attempts to retract dog 111 and that dog will be immediately retracted in case barney 61 has been pushing the trip of cars and the dog 111 is not in engagement with a car lug. However, if barney 61 has been retarding leftward movement of the trip of cars, the dog 111 will be in engagement with a car lug and cannot be retracted. At this time, however, the dog 115 on barney 62 comes into engagement with a car and movement of the trip of cars is momentarily checked. Barney 61 continues to move to the left in the manner described above until the dog 111 disengages the car. This continued leftward movement of barney 61 is permitted by leftward movement of the sheave 82 as described above. The dog 111 is then retracted to car-disengaging position and finger 123 engages the operating plunger of four-way valve 121 to shift that valve to the left from the position shown in the drawing. Fluid under pilot pressure then flows through valve 121 and line 203 to the second operating cylinder 204 of hydraulically operated valve 166, and valve 166 is shifted back to the position shown in Figure 17. Fluid under operating pressure will then again be supplied to cylinder 73 and the cycle will be repeated.

The purpose of the pressure relief valve 205 is to prevent development of excessive pressure in the outlet of the pump 162. The check valve 206 in the return line 169 may be spring-loaded to maintain slight pressure in the return line. Attention may be called to the fact that at any stage of operation two of the four cylinders 63, 66, 73 and 77 will be discharging fluid into the return lines and only one of those cylinders will be receiving fluid from the return lines. There is thus always an excess of fluid in the return lines which is available for filling the cylinder 66 or 77 of a retracting barney. This excess of fluid in the return lines can pass through the valve 206 to the tank 163.

The second form of the invention, as indicated above, is capable of advancing a trip of cars in either direction and of retarding movement of the trip of cars in either direction. In other words, in the second form of the invention, the trip of cars may be moved forward or backward at the will of the operator. This feature finds its greatest utility at unloading stations such as rotary dumps. Sometimes when a car enters a rotary dump the engaging lugs on the dump do not hold the car and it is necessary to back the car out of the dump and again advance it into proper position.

The second or reversible form of the invention bears considerable similarity to the form of the invention already described and it will, therefore, be sufficient to describe only the features of the second form of the invention which distinguish it from the first form.

The barneys are quite similar in both forms of the invention, but in the reversible apparatus both dogs on each barney are hydraulically retractable. One such barney is illustrated in Figures 13, 14 and 15 and is generally designated by the reference numeral 210. The dog 115 is identical to the similarly numbered dog previously described, is controlled by the cylinder, piston and spring assembly 117, and the movement of this dog controls the four-way valve 122. The dog 211 is pivotally mounted on a shaft 212 and is moved between projected and retracted positions by means of a cylinder, piston and spring assembly 213. Movement of the dog 211 controls a four-way valve 214. Figure 15 clearly illustrates the relationship of the dog 115, the cylinder, piston and spring assembly 117, the finger 124 and the valve 122. Mounted within the cylinder 216 of the assembly 117 is a piston 217 which is resiliently biased toward the right, as seen in Figure 15, by a compression spring member 218. The spring member 218 serves to project the dog 115 into car engaging position. The dog is retracted to car disengaging position by fluid pressure issuing through the port 219. It will be understood that the position of the dog 211 is similarly controlled by the assembly 213.

The barneys used in the reversible form of the invention are connected by means of the cable 81 which extends over the movable sheave 82 in the manner described above. However, the barneys in this reversible form of the invention are also connected by means of a cable 221 which extends over a movable sheave 222 (Figure 11). The sheave 222 is provided with supporting plates 223 which are slideable on guide bars 224 and 225 mounted on the side rails 226 and 227 respectively. The position of the sheave 222 is controlled by a piston rod 228 which extends into a hydraulic cylinder 229 and which carries on its inner end the piston 230. The sheave 222 thus has its position controlled in the same manner as the sheave 82 described above. The advancing barney is by this arrangement permitted to partake of limited continuing advancing movement in either direction after its companion barney has reached the limit of its retracting stroke.

In other respects the mechanical features of the reversing form of the apparatus are similar to the non-reversing form of apparatus already described. There are, however, essential differences in the hydraulic systems. The hydraulic system for the reversing form of the apparatus is illustrated in Figure 18. A manually operated four-way valve 240 is capable of directing fluid under pilot pressure from the pump 241 to all of the points marked "F" or to all of the points marked "R" in Figure 18. Manipulation of the valve 240 to direct fluid under pilot pressure to the points marked "F" will cause movement (or retardation) of the trip of cars forward or to the right as seen in Figure 18, and manipulation of the valve 240 to direct fluid under pilot pressure to the points marked "R" will cause movement (or retardation) of the trip of cars rearward or to the left.

The pump 242 is shown as supplying fluid under operating pressure through valves 243 and 244 to cylinder 245 to move barney 210 to the right or in the forward direction. At this time fluid from cylinder 246 is being discharged through valve 247 and balancing valve 248 to the dotted return line 249 and check valve 250 to the tank 251. Under these conditions the manually operated valve 240 is in the position shown in the drawing, while barney 210 is pushing the trip of cars. The balancing valve 248 remains open to permit fluid to be discharged from cylinder 246. However, if the trip of cars attempts to overrun barney 210, the pressure in cylinder 245 will drop. The cylinder 245 is in communication with balancing valve 248 through valves 244 and 255 and a drop in pressure in cylinder 245 will cause balancing valve 248 to stop or throttle discharge of fluid from cylinder 246. The rightward movement of the trip of cars will thus be checked or stopped until pressure again builds up in cylinder 245. The purpose of pressure relief valve 257 is to prevent excessive pressure in cylinder 246 in case the trip of cars is bumped during coupling.

Barney 210 and the trip of cars continues to move to the right in the manner described above until the barney 210 reaches the limit of its power stroke (as distinguished from its maximum stroke). Barney 210 controls the position of a camming member 260 and when barney 210 reaches the end of its power stroke in the rightward direction, camming member 260 depresses the operating plunger of four-way valve 261 to place that valve in the position shown in the drawing. Fluid under pilot pressure can then flow from the pump 241 through the valve 261 and through valve 262 to the piston and cylinder assemblies 117 and 213 which control the retraction of the dogs 115 and 211 respectively on barney 210. It will be assumed that dog 211 on barney 210 has been retarding movement of the trip of cars and that dog is therefore in engagement with a car lug and cannot immediately be retracted. Dog 115 is not in engagement with the car lug and is immediately retracted by fluid pressure in cylinder and piston assembly 117. It will readily be seen that under these conditions barney 210 cannot immediately begin its retracting stroke for the reason that dog 211 is in engagement with the car lug. The apparatus is prevented from attempting to retract barney 210 at this time. Inactivation of the dog 115 causes finger 124 to move valve 122 to the left from the position shown in Figure 18. Fluid can then flow from valve 262 through valve 122 and line 265 to four-way valve 266. However, the port 267 of valve 266 is blocked so flow of fluid through valve 122 cannot operate to shift valve 243 from the position shown in the drawing. For this reason barney 210 will continue to advance to the right, this continued advancing movement being permitted by the movable mounting of the sheave 222. This continued rightward movement of barney 210 will eventually cause dog 211 to become disengaged from the car lug and that dog will then be retracted by the cylinder and piston assembly 213. Retraction of dog 211 causes movement of valve 214 to the right from the position shown in the drawing. Fluid under pilot pressure can then flow from pump 241 through valves 261, 262 and 214 and line 270 to valve 266. The port in valve 266 with which line 270 communicates is open to line 271 and fluid under pilot pressure can thus flow through line 271 to the operating cylinder 272 of hydraulically operated valve 243 to cause shifting of valve 243 upwardly from the position shown in the drawing.

Fluid under operating pressure will then be supplied by pump 242 through now shifted valve 243 and line 275 to valve 276 and to the cylinder and piston assembly 277, which actuates companion barney 281. Barney 281 will then begin to move to the right or in the forward direction. During rightward or forward movement of barney 281, the barney 210 will be retracted by the cable 221 which extends over sheave 222. Rightward movement of barney 281 causes fluid to be discharged from cylinder and piston assembly 282 through line 283, valve 284 and balancing valve 285 from which the fluid is returned to the tank 251 through the check valve 250. This situation will continue so long as barney 281 is pushing the trip of cars. Should the trip of cars attempt to overrun barney 281, the pressure in cylinder 277 will drop. The pressure in cylinder 277 is communicated to balancing valve 285 through valves 276 and 290, and a drop in pressure in cylinder 277 will cause balancing valve 285 to throttle or completely stop the flow of fluid from cylinder 282. Overrunning of the trip of cars in the forward direction will thus be effectively retarded until pressure again builds up in cylinder 277.

Movement of barney 281 controls the position of a camming member 295. When barney 281 reaches the limit of its rightward or forward power stroke (as distinguished from its maximum stroke) the camming member 295 engages the operating plunger of four-way valve 296 and moves that valve upwardly from the position shown in the drawing. Fluid under pilot pressure can then flow from pump 241 through valve 296 and valve 297 to the cylinder and piston assemblies 298 and 299 which respectively control retraction of the forwardly and rearwardly facing dogs on the barney 281.

Let it be assumed that barney 281 is retarding forward movement of the trip of cars. The forwardly facing dog on barney 281 will be out of engagement with the car lug and will be immediately retracted by cylinder and piston assembly 298. However, the rearwardly facing dog on barney 281 will be in engagement with a car lug and cannot be immediately retracted by cylinder and piston assembly 299. Retraction of the forwardly facing dog by cylinder and piston assembly 298 causes valve 301 to be moved to the left from the position shown in Figure 18. Fluid under pilot pressure can then flow from pump 241 through valves 296, 297 and 301 and through line 302 to hydraulically operated valve 303. However, the port 304 of valve 303, with which line 302 communicates, is blocked and no fluid can flow to cause shifting of the valve 243. Barney 281 then continues its forward movement until the rearwardly facing dog thereon disengages the car and that dog will then be retracted by cylinder and piston assembly 299. The retracting movement of the rearwardly facing dog on barney 281 causes the valve 306 to move to the right from the position shown in the drawing. Fluid under pilot pressure can then flow from pump 241 through valves 296, 297 and 306 and through line 307 and valve 303 to the hydraulically operated cylinder 309 of valve 243. Valve 243 will thus be shifted back to the position shown in the drawing and the cycle as described above will begin to repeat itself.

When movement of the trip of cars, either in being positively advanced or in having its motion retarded, is to the right or in the forward direction, the cylinder 229 which controls or establishes the normal or zero position of sheave 222 is supplied with fluid under pilot pressure from the pump 241. At this time the sheave 82 has its position controlled by fluid pressure in the cylinder 88, which is the pressure existing in the return lines to the tank 251. The pressure in the return lines to the tank 251 is controlled by the spring loading on the check valve 250 and that loading is such that the pressure in the return lines is substantially below the pilot pressure delivered by the pump 241. The low fluid pressure in the cylinder 88 will, however, maintain taut the cables 81 and 221 extending over the sheaves 82 and 222 respectively. Fluid pressure in cylinder 88 serves no other function during forward movement of the trip.

The rate of movement of the trip of cars can be controlled by the manually operated flow control valve 312 which permits any desired amount of fluid delivered by the pump 242 to be by-passed back to the tank 251.

In order to reverse the direction of movement of the trip of cars, the manually operated valve 240 is moved to the left from the position shown in the drawing. This operation places the pilot pump 241 in communication with all points marked "R" on the drawing and also places all points marked "F" in communication with the return lines to the tank 251. Under these conditions the mode of operation will be essentially the same as that described above except that the cylinders 246 and 282 will function as the power cylinders and the rate of discharge of fluid from the cylinders 245 and 277 will control retardation of the trip. Also under these circumstances the fluid pressure in the cylinder 88 will be pilot pressure as delivered by pump 241 and the piston 87 within the cylinder 88 will establish the normal or zero position of the sheave 82. The pressure in the cylinder 229 will be equal to the pressure in the return lines to the tank 251 and sheave 222 will serve to keep the cables 81 and 221 in taut condition. The valves 244, 247, 255, 262, 266, 276, 284, 290, 297 and 303 will of course be shifted by pilot pressure from the positions shown in the drawing during leftward or reverse movement of the trip of cars.

It will be seen from the foregoing that the operator can cause or retard motion of the trip of cars in either direction by proper manipulation of the manually operated valve 240. It will also be seen that the operator can control the rate of the movement of the trip of cars by proper manipulation of the manually operated flow control valve 312. Any valves not specifically mentioned in the discussion of Figure 18 have the same functions as the comparable valves described above in the description of Figure 17.

Attention should be called to the fact that in neither form of the invention can a barney start its retracting movement until the rearwardly facing or car retarding dog has moved to retracted or car disengaging position. In the first or non-reversing form of the invention the car retarding dogs are the hydraulically retracted dogs and the barney cannot begin its retracting movement until those car retarding dogs have moved to car disengaging position. In the reversing form of the invention all of the dogs are hydraulically inactivated but inactivation of the car pushing dogs will not permit the barneys to begin their retractive movement; it is only when the car retarding dogs are moved to car disengaging position that the barneys can begin their retracting movement. This is regarded as a very important feature of the invention in that it prevents one barney from attempting to advance a car while its companion barney is attempting to retard the car or to move the car in the opposite direction.

Another very important feature of the invention is the provision of the means to enable an advancing barney to partake of limited continuing advancing movement after its companion barney has reached the limit of its retracting movement. This feature makes it possible to disengage a car retarding dog from the car lug to thus enable the advanced barney to be retracted.

Figure 22:
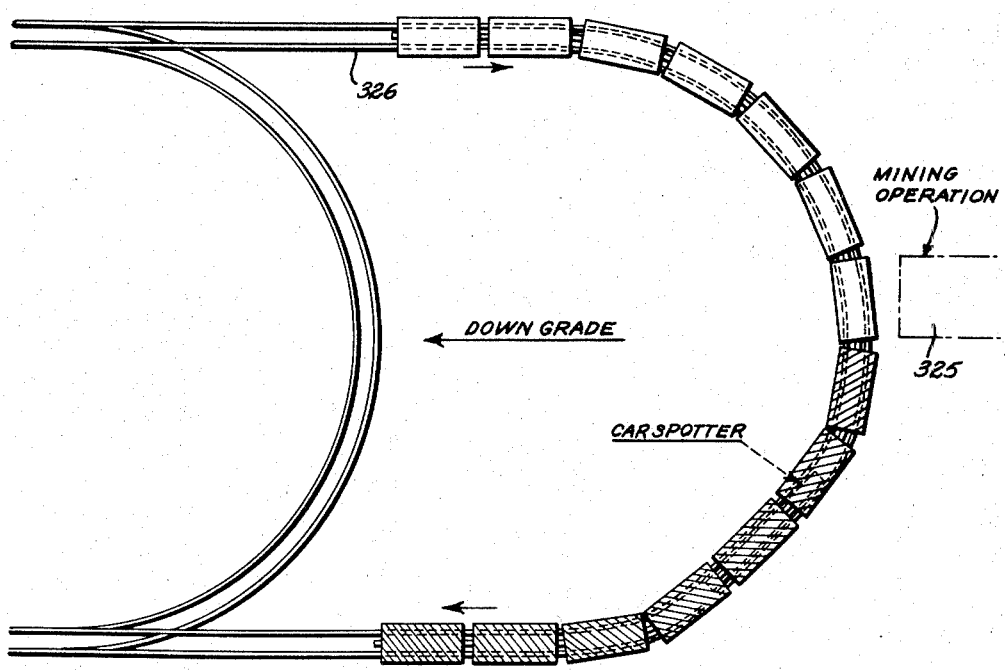
Figure 22 is a somewhat diagrammatic view of a section of track and a trip of cars with the apparatus of the invention being used in the operation known as "loop haulage."

One condition of operation in which either form of the invention can be used advantageously is illustrated in Figure 22 and is known as loop haulage. The site of the mining operation is designated by the reference numeral 325. The railway track 326 forms a loop in front of the mining operation and both ends of the loop slope downgrade from the mining operation. The apparatus of the present invention can be placed in any convenient position such as the position designated "car spotter" in Figure 22. Mining cars which have been loaded are shown cross-hatched and cars to be loaded are unhatched. The apparatus can be used to positively advance the trip of cars until such time as the tendency of the loaded cars to run downgrade is sufficient to pull the unloaded cars upgrade. The apparatus is thereafter used to retard movement of the trip of cars. The change from advancing movement to retardation occurs automatically without attention on the part of the operator.

I have illustrated and described what I now consider to be the preferred embodiments of the invention. It will be understood however, that various changes and modifications may be resorted to without departing from the broader scope of the invention which is defined by the following claims.

Having thus described my invention, I claim:

1. In apparatus for advancing or retarding a vehicle along a path of movement: a barney arranged for movement along said path; means on said barney for engaging a vehicle and restraining the vehicle to move with the barney; fluid operated power means for advancing said barney along said path; fluid controlled retarding means for controlling the rate of advancing movement of said barney along said path; means for supplying fluid to said power means to advance said barney along said path; conduit means discharging fluid from said retarding means during advancing movement of said barney; and valve means in said conduit means responsive to a reduction of fluid pressure in said power means for reducing the rate of discharge of fluid from said retarding means, whereby when such vehicle attempts to advance said barney there is a reduction in the fluid pressure in said power means and a throttling of discharge of fluid from said retarding means with consequent retardation of movement of said barney and the vehicle along said path.

2. In apparatus for advancing or retarding cars along a path of movement: a car engaging barney arranged for longitudinal movement along said path; a barney advancing fluid motor for advancing said barney along said path; a barney retarding cylinder and piston assembly for retarding advancing movement of said barney along said path by discharge of fluid from said cylinder; a conduit for discharge of fluid from said cylinder upon advancing movement of said barney along said path and valve means in said conduit responsive to reduction in fluid pressure in said fluid motor for throttling discharge of fluid through said conduit, whereby a reduction in fluid pressure in said fluid motor resulting from a tendency of the cars to advance said barney will actuate said valve means to cause said cylinder and piston assembly to retard advancing movement of said barney.

3. Apparatus for advancing or retarding vehicles along a path of movement, comprising a first barney and a second barney, a first fluid motor secured to said first barney for advancing the same longitudinally along said path of movement, a second fluid motor secured to said second barney for advancing the same longitudinally along said path of movement in longitudinally staggered and parallel relation to the movement of said first barney, a vehicle advancing dog and a vehicle retarding dog on each of said barneys, barney retracting means responsive to advancing movement of one of said barneys for retracting the other of said barneys along said path, first valve means for alternately supplying fluid to said first and second fluid motors, a cylinder and piston assembly secured to each of said barneys for limiting the rate of advance of its respective barney by discharge of fluid from the cylinder of such assembly, a conduit for discharge of fluid from each of said cylinders, second valve means in each of said conduits responsive to reduction in fluid pressure in said fluid motor of its respective barney for throttling discharge of fluid through said conduit, dog actuating means on each barney for moving to vehicle disengaging position the vehicle retarding dog on the advanced barney, means responsive to a barney reaching the end of its advancing stroke for activating said dog actuating means thereon to move to vehicle disengaging position the vehicle retarding dog thereon, and means responsive to movement to vehicle disengaging position of the vehicle retarding dog on an advanced barney for actuating said first valve means to supply fluid to said fluid motor of the retracted barney.

4. Apparatus for advancing or retarding vehicles along a path of movement, comprising a first barney and a second barney, a first fluid motor for advancing said first barney along said path, a second fluid motor for advancing said second barney along said path in longitudinally staggered relationship to said first barney, a vehicle advancing dog and a vehicle retarding dog on each barney, a cable connected to said barneys, a sheave, means mounting said sheave between said barneys, said cable running over said sheave and normally retracting one barney along said path while the other barney is being advanced along said path, said sheave mounting means being yieldable in the direction of pull of the cable on the sheave to achieve limited advancing movement of the advancing barney after the retracting barney has reached the limit of its retracting movement, dog actuating means on each barney for urging the vehicle retarding dog on the barney toward vehicle disengaging position, means responsive to a barney reaching the end of its vehicle advancing stroke for activating said dog actuating means on the advanced barney, and valve means responsive to movement to vehicle disengaging position of the vehicle retarding dog on an advanced barney to energize the fluid motor for advancing the retracted barney.

5. Apparatus for advancing or retarding vehicles along a path of movement, comprising a first barney and a second barney, a first fluid motor for advancing said first barney along said path, a second fluid motor for advancing said second barney along said path in longitudinally offset relationship to said first barney, first valve means for alternately energizing said fluid motors, forwardly and rearwardly facing vehicle engaging dogs on each barney, a cable connected to said barneys, a sheave, means mounting said sheave between said barneys, said cable running over said sheave and normally retracting one barney along said path while the other barney is being advanced along said path, said sheave mounting means being yieldable in the direction of pull of the cable on the sheave to achieve limited advancing movement of the advancing barney after the retracting barney has reached the limit of its retracting movement, dog actuating means on each barney for urging the rearwardly facing dog on the barney toward vehicle disengaging position, means responsive to a barney reaching the end of its vehicle advancing stroke for actuating said dog actuating means on the advanced barney, and second valve means actuated by movement to vehicle disengaging position of the rearwardly facing dog on an advanced barney to actuate said first valve means to energize the fluid motor for advancing the retracted barney.

6. Apparatus for advancing or retarding cars along a path of movement comprising a pair of barneys arranged for parallel but longitudinally offset reciprocatory movement along said path, fluid motors connected to said barneys for alternately advancing said barneys, cylinder and piston means connected to said barneys for limiting the rate of advancing movement of each barney by discharge of fluid from the cylinder thereof, a conduit for discharge of fluid from the cylinder of each of said cylinder and piston means, first valve means in each conduit responsive to reduction in fluid pressure in the fluid motor of its respective barney for throttling discharge of fluid through said conduit, forwardly and rearwardly facing car engaging dogs on each barney, means connected to said barneys for retracting one of said barneys while the other is advancing, power means on each barney moving to car disengaging position the rearwardly facing dog thereon, means responsive to a barney reaching the end of its car advancing stroke to activate said power means on the advanced barney, and second valve means actuated by movement to car disengaging position of the rearwardly facing dog of the advanced barney to apply fluid pressure to the fluid motor to advance the retracted barney.

7. Apparatus for advancing or retarding cars along a path of movement comprising a pair of barneys arranged for substantially parallel reciprocatory movement along said path, power means alternately advancing said barneys, means retracting one of said barneys while the other is advancing, forwardly and rearwardly facing car engaging dogs on each of said barneys, dog actuating means on each barney for moving the rearwardly facing dog thereon to car disengaging position, means responsive to movement of a barney to the end of its advancing stroke for activating the dog actuating means on the advanced barney, and means actuated by movement to car disengaging position of the rearwardly facing dog of the advanced barney for causing said power means to advance the retracted barney.

8. Apparatus for advancing or retarding a vehicle in either direction along a path of movement, a pair of barneys movable substantially parallel to said path, cylinder and piston means for moving each of said barneys on a power stroke in either direction, barney retracting means moving one barney on a retracting stroke in one direction while the other barney is moving on a power stroke in the opposite direction, each of said cylinder and piston means including first valve means for limiting the rate of movement of its respective barney, a pair of oppositely facing vehicle engaging dogs on each barney, a dog actuating means on each barney for inactivating the rearwardly facing dog thereon, means responsive to a barney reaching the end of its vehicle advancing stroke for activating said dog actuating means on the advanced barney, and second valve means responsive to inactivation of a rearwardly facing dog on one barney for actuating said cylinder and piston means for moving the other barney on a power stroke.

References Cited in the file of this patent

UNITED STATES PATENTS

| | | |
|---|---|---|
| 1,551,122 | Sheppard | Aug. 25, 1925 |
| 1,741,833 | Ferris | Dec. 31, 1929 |
| 2,575,396 | Schenk | Nov. 20, 1951 |
| 2,606,504 | Stampler | Aug. 12, 1952 |
| 2,784,852 | Strauss et al. | Mar. 12, 1957 |

FOREIGN PATENTS

| | | |
|---|---|---|
| 561,976 | Germany | Oct. 20, 1932 |
| 761,082 | Germany | Feb. 9, 1953 |